(12) United States Patent
Pasricha et al.

(10) Patent No.: US 7,966,600 B2
(45) Date of Patent: Jun. 21, 2011

(54) DISTRIBUTED RESOURCE UNDERSTANDING TOOL MANAGEMENT

(75) Inventors: Ankit Pasricha, Mississauga (CA); David K. McKnight, Newmarket (CA); Peter A. Nicholls, Janetville (CA)

(73) Assignee: International Business Machines Corporation, Armonk, NY (US)

( * ) Notice: Subject to any disclaimer, the term of this patent is extended or adjusted under 35 U.S.C. 154(b) by 1278 days.

(21) Appl. No.: 11/533,267

(22) Filed: Sep. 19, 2006

(65) Prior Publication Data

US 2008/0127034 A1  May 29, 2008

(51) Int. Cl.
*G06F 9/44* (2006.01)
*G06F 9/45* (2006.01)
(52) U.S. Cl. ......... 717/105; 717/109; 717/111; 717/113
(58) Field of Classification Search .................. None
See application file for complete search history.

(56) References Cited

U.S. PATENT DOCUMENTS

2003/0229884 A1* 12/2003 Carr et al. ..................... 717/101
* cited by examiner

*Primary Examiner* — Chuck O Kendall
(74) *Attorney, Agent, or Firm* — Steven M. Greenberg, Esq.; Carey, Rodriguez, Greenberg & Paul

(57) ABSTRACT

Embodiments of the present invention provide a method, system and computer program product for a distributed resource understanding tool. In one embodiment of the invention, a distributed resources understanding tool data processing system can include an IDE configured for operation in a local development platform coupled to a remote host, a local implementation of a resource understanding tool coupled to the IDE, a remote implementation of the resource understanding tool associated with the remote host, and resource understanding tool synchronization logic. The logic can include program code enabled to invoke the local implementation of the resource understanding tool, further invoke the remote implementation of the resource understanding tool, combine results sets produced by each of the local and remote implementations of the resource understanding tool to produce a composite results set, and render the composite results set in the IDE.

17 Claims, 2 Drawing Sheets

DISTRIBUTED RESOURCE UNDERSTANDING TOOL MANAGEMENT

BACKGROUND OF THE INVENTION

1. Field of the Invention

The present invention relates to the field of resource understanding tools and more particularly to distributed resource understanding.

2. Description of the Related Art

Software development has advanced from the primitive form of the mid-twentieth century to today. Early software development involved few assistive tools and often took the form of punch card processing. Later software development permitted the electronic keying of source code that could be processed by a separate compiler and linker to produce an executable computer program. Modern software development environments, however, provide a wide array of assistive tools, often grouped together in an integrated development environment (IDE). Advanced forms of the IDE further include resource understanding tools.

Resource understanding tools refer to assistive tools that facilitate the development and deployment of program code or other application logic utilizing ancillary resources such as text strings, bitmapped graphics, fonts, data stores and the like. Generally, a resource understanding tool can provide assistance to a developer in forming or modifying program code. Exemplary uses include content assist tools that automatically present content such as available operands to complete a source code expression, a list of bitmapped resources available for use in a user interface, and a list of data stores able to be accessed through a source code expression, to name only a few.

Resource understanding tools provide the backbone for integrated development environments. Such tools enhance code understanding and empower software developers to perform many sophisticated programming operations that can dramatically improve productivity. Abstract Syntax Tree (AST) builders and the features that make use of the produced constructs are not new and have been utilized for many years by developers. When a developer targets the local platform, AST builders can be invaluable. Notwithstanding, there are limitations that existing implementations impose on other software development niches.

For instance, there are cases where a programmer must write, analyze, test and debug software for specific platforms other than programmer's workstation. In many cases, a programmer does not have direct access to the target platforms, such as the case when the target platform is a mainframe or midrange computer, or where the target platform is a special device such as a mobile phone, a grid computing system, or where the target is a multi-platform system. In these cases, resource understanding tools can be restricted in scope.

To serve programmers well, the complete set of resources required by a project must be accessible by the resource understanding tool. For example, in order to produce a proper AST for a distributed application project, a parser must access not only the resources that make up the project, but also the include files and macros defined on all remote, host platforms. Although users may still be able to work with the resources of a project locally while gathering some understanding of those resources through local tooling, the local tooling would be unable to access the included files and macros in the environment of the different host platforms. Accordingly, conventional resource understanding tools running in the local environment cannot produce an accurate or complete understanding of the resources of a distributed application project.

Given that the accessibility of the complete set of resources and the target environment is required to produce a complete and accurate understanding of a software development project, a natural solution would include running the resource understanding tool on the remote host rather than on the local client. Notwithstanding, since the programmer remains bound to the local workstation, a mechanism to connect the local IDE to the remote resource understanding tool remains. Consequently, such a solution can become far more complicated than the local scenario because now the tooling is spread out such that the user interface (UI), program visualization, and editing occurs locally while program understanding occurs on the host.

Not only would this proposed solution perform slowly due to the additional remote communications link but also, because the programmer edits source code locally, one skilled in the art would recognize that the remote resource understanding tool would have an even less accurate understanding of the resources than the incomplete localized solution version. Furthermore, the remote resource understanding tool would be unavailable for users wishing to do development offline.

BRIEF SUMMARY OF THE INVENTION

Embodiments of the present invention address deficiencies of the art in respect to resource understanding and provide a novel and non-obvious method, system and computer program product for a distributed resource understanding tool. In one embodiment of the invention, a distributed resources understanding tool data processing system can be provided. The system can include an IDE configured for operation in a local development platform coupled to a remote host, a local implementation of a resource understanding tool coupled to the IDE, a remote implementation of the resource understanding tool associated with the remote host, and resource understanding tool synchronization logic.

The logic can include program code enabled to invoke the local implementation of the resource understanding tool, further invoke the remote implementation of the resource understanding tool, combine results sets produced by each of the local and remote implementations of the resource understanding tool to produce a composite results set, and render the composite results set in the IDE. In one aspect of the embodiment, the resource understanding tool can include distributed content assist. In another aspect of the embodiment, the resource understanding tool can include distributed open declaration.

Optionally, the system can include a results cache coupled to the resource understanding tool synchronization logic. As such, the resource understanding tool synchronization logic further can include additional program code enabled to populate the results cache with remote resources frequently selected for use once produced by the remote implementation of the resource understanding tool. As another option, the system further can include distributed buffer synchronization logic. The distributed buffer synchronization logic can include program code enabled to synchronize a local implementation of a buffer for the IDE with a remote implementation of a buffer for a remote IDE.

In another embodiment of the invention, a distributed resource understanding tool management method can be provided. The method can include invoking a local implementation of a resource understanding tool in a local IDE, further invoking a remote implementation of the resource understanding tool in a remote host, combining results sets produced by each of the local and remote implementations of the resource understanding tool to produce a composite results set, and rendering the composite results set in the local IDE. The method further can include caching frequently selected resources from the composite results set in a local cache, and retrieving resources from the local cache when producing the composite results set.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for distributed resource understanding tool management. In accordance with an embodiment of the present invention, a resource understanding tool can be disposed both locally in a development platform and remotely in a target platform. Responsive to the activation of the resource understanding tool locally, the remote understanding tool can be invoked and the result sets produced by each can be combined to produce a composite result set. The composite result set in turn can be utilized within the development environment of the development platform. In this way, the composite result set can represent full resource knowledge both for the resources accessible locally and those accessible remotely.

Figure 1:
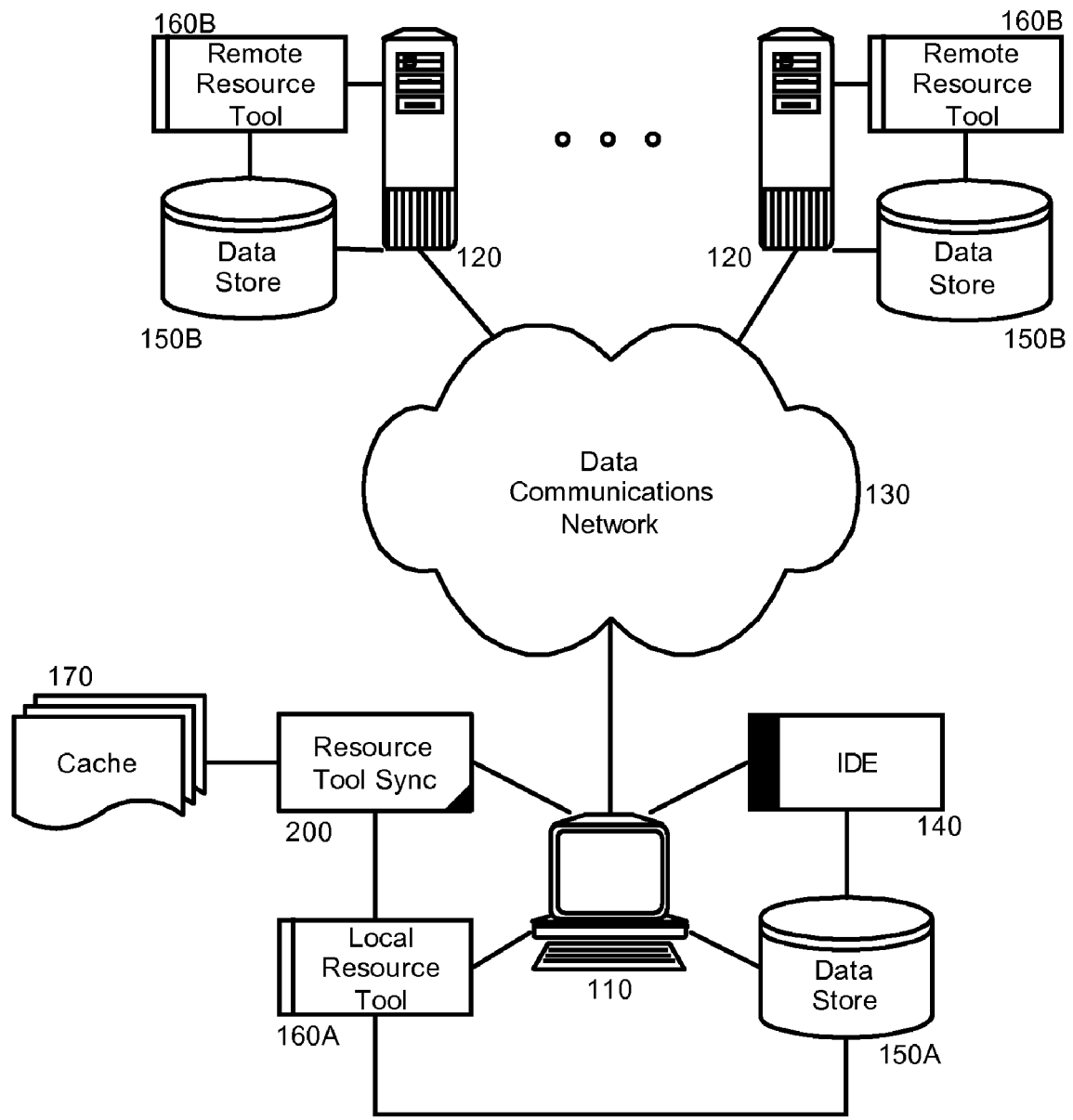
FIG. 1 is a schematic illustration of a distributed application development environment configured for distributed resource understanding tool management; and, FIG. 2 is a flow chart illustrating a process for managing a distributed resource understanding tool.

In further illustration, FIG. 1 is a schematic illustration of a distributed application development environment configured for distributed resource understanding tool management. The distributed development environment can include a local development platform 110 coupled to one or more remote target hosts 120 over a computer communications network 130. The local development platform 110 can support the operation of an IDE 140 with which a distributed application can be developed for distribution onto the remote target hosts 120.

The IDE 140 can be coupled to a data store 150A in which one or more resources can be stored for use in developing the distributed application. Likewise, each of the remote target hosts 120 can be coupled to a data store 150B in which one or more resources can be stored for use in developing the distributed application. To that end, a local resource understanding tool 160A can be provided in the local development platform 110. The local resource understanding tool 160A can include, by way of example, a content assist tool, or an open declaration tool, the functionality of each which is well-known in the art. Likewise, a remote resource understanding tool 160B can be coupled to each of the remote target hosts 120. Each of the local and remote resource understanding tools 160A, 160B can operate upon the resources disposed within respective ones of the data stores 150A, 150B.

Notably, resource understanding tool synchronization logic 200 and companion cache 170 can be coupled to the local resource understanding tool 160A and the local development platform 110. The resource understanding tool synchronization logic 200 can include program code enabled to manage the composition of result sets produced by the concurrent operation of the local resource understanding tool 160A and the remote resource understanding tools 160B in response to a single invocation for a development activity within the IDE 140 in the local development platform 110. Optionally, the cache 170 can be provided to locally cache selected results from the operation of the remote resource understanding tools 160B so as to avoid unnecessary network communications.

In operation, during the development process, source code can be provided through the IDE 140. The local resource understanding tool 160A can be activated for use through the IDE 140 and can be invoked from time to time. Upon invocation, remote resource understanding tools 160B can be concurrently invoked, each to produce a result set along with the local resource understanding tool 160A. The result set produced by the local resource understanding tool 160 can be provided through the IDE 140. Additionally, as the result sets of the remote resource understanding tools 160B are received in the resource understanding tool synchronization logic 200, those received result sets can be used to augment the result set of the local resource understanding tool 160A.

Figure 2:
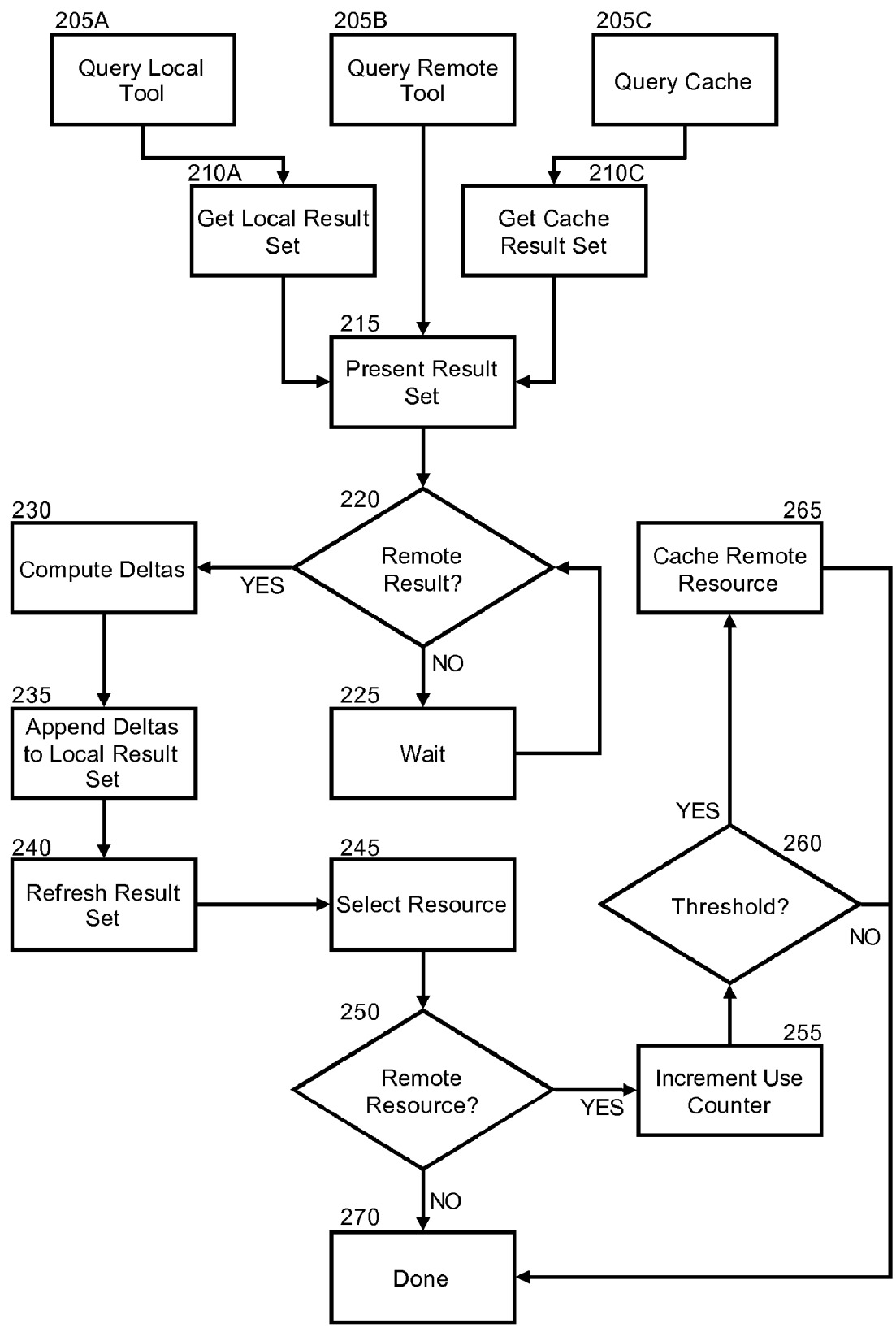

In yet further illustration, FIG. 2 is a flow chart illustrating a process for managing a distributed resource understanding tool. Beginning concurrently in blocks 205A, 205B and 205C, both the local and remote resource understanding tools can be queried with contextual information along with the content of a results cache. In block 210A, a result set can be retrieved from the use of the local resource understanding tool and in block 210C, a result set, if any, can be retrieved by running the local understanding tool on the locally cached remote resources. The result sets can be combined and presented through the IDE in block 215 while awaiting the result provided by the remote resource understanding tool.

In decision block 220, if a result set has not been received from the remote resource understanding tool, in block 225 the process can await the result set. Once a result set has been received from the remote resource understanding tool, in block 230, the differences between the result sets can be computed. In block 235, the entries in the result set from the remote resource understanding tool that had not been included as part of the combined result set from the local resource understanding tool and the results cache can be appended to the combined result to produce a final, composite result set. Thereafter, in block 240, the result set previously presented in block 215 can be refreshed for presentation through the IDE.

Optionally, when an entry in the composite result set has been selected for use through the IDE in block 245, in decision block 250, it can be determined whether the selected resource is a remote resource. If so, in block 255, a counter maintained for the selected resource can be incremented. In decision block 260, if the counter value exceeds a pre-determined threshold, indicating the frequent selection of the remote resource from a composite result set produced through the invocation of the local and remote resource understanding tools, in block 265, the remote resource can be added to the cache so that future invocations of the local and remote resource understanding tools can result in the cached remote resource being retrieved locally from the cache rather than remotely over the computer communications network. Thereafter, in block 270 the process can end.

The process of FIG. 2 can be applied to several resource understanding tool implementations. For instance, in a distributed content assist implementation, in an editor when a user selects a particular key-combination, an operation ordinarily is invoked that determines, from the context of the code in which the user is editing, what the set of appropriate text completions should be. The possible completions are determined by producing an AST from the local resources, examining the constructs of the produced AST and, given the editor context, finding those that are valid and likely to make sense for the user.

When all the resources are not local, the AST produced in conventional content assist is incomplete and therefore the possible completions presented to the user are incomplete as well. In order to provide the complete set, the AST builder must also execute on the host where all the resources reside as well as on the local platform. To that end, a remote content assist operation is performed, in the same way as the local content assist, but on the host side. The results of the operation are sent back to the client to be combined with the results of the local content assist and presented to the user as a composite result set.

In another implementation, a distributed open declaration tool can be provided. Distributed open declaration can be performed in a similar way to distributed content assist. In distributed open declaration, when a user selects a text portion in an editor and invokes the "Open Declaration" operation, the following two operations occur—a local open declaration operation and a remote open declaration operation. In the local open declaration operation, an AST can be formed using the local tooling and resources. The AST can be searched for the selected text portion. If a match is found within the AST, the resource containing the declaration is opened and the declaration is presented to the user. Otherwise, if there is no local match, the process can await the completion of the remote open declaration operation. Once the remote open declaration operation has completed, the AST in the remote host can be searched for the selected text portion. If a match is found in the remote AST, the resource containing the declaration can be opened and the declaration can be presented to the user. Otherwise, an empty set can be produced.

In order to maintain the integrity of the results produced by the local and remote content assist and open declaration applications, the editor buffer for the IDE must remain harmonized both in the remote host and in the local development platform. To that end, distributed buffer synchronization will be required. In distributed buffer synchronization, the local tooling utilizes the IDE editor buffer for producing ASTs. Likewise, the remote tooling utilizes a remote IDE editor buffer. In operation, whenever the local IDE editor buffer changes, a delta of the change can be recorded and transferred to the remote side so as to keep the corresponding remote buffer in synch with the transient changes in the local IDE editor.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from at least one computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A distributed resources understanding tool data processing system comprising:
   a computer with at least one processor and memory;
   an integrated development environment (IDE) configured for operation in a local development platform coupled to a remote host;
   a local implementation of a resource understanding tool coupled to the IDE;
   a remote implementation of the resource understanding tool associated with the remote host; and,
   resource understanding tool synchronization logic executing in the memory of the computer and comprising program code enabled to invoke the local implementation of the resource understanding tool, further invoking the remote implementation of the resource understanding tool, combine results sets produced by each of the local and remote implementations of the resource understanding tool to produce a composite results set, and render the composite results set in the IDE.

2. The system of claim 1, wherein the resource understanding tool comprises distributed content assist.

3. The system of claim 1, wherein the resource understanding tool comprises distributed open declaration.

4. The system of claim 1, further comprising a results cache coupled to the resource understanding tool synchronization logic, the resource understanding tool synchronization logic further comprising additional program code enabled to populate the results cache with remote resources frequently selected for use once produced by the remote implementation of the resource understanding tool.

5. The system of claim 1, further comprising distributed buffer synchronization logic comprising program code enabled to synchronize a local implementation of a buffer for the IDE with a remote implementation of a buffer for a remote IDE.

6. A distributed resource understanding tool management method comprising:
  invoking a local implementation of a resource understanding tool in a local integrated development environment (IDE) executing in memory by at least one processor of a computer;
  further invoking a remote implementation of the resource understanding tool in a remote host;
  combining results sets produced by each of the local and remote implementations of the resource understanding tool to produce a composite results set; and,
  rendering the composite results set in the local IDE.

7. The method of claim 6, further comprising:
  caching frequently selected resources from the composite results set in a local cache; and,
  retrieving resources from the local cache when producing the composite results set.

8. The method of claim 6, wherein invoking a local implementation of a resource understanding tool in a local IDE comprises invoking a local implementation of a content assist on an editor buffer for a local IDE, and wherein further invoking a remote implementation of the resource understanding tool in a remote host, comprises further invoking a remote implementation of the content assist on an editor buffer in a remote host.

9. The method of claim 6, wherein invoking a local implementation of a resource understanding tool in a local IDE comprises invoking a local implementation of an open declaration on an editor buffer for a local IDE, and wherein further invoking a remote implementation of the resource understanding tool in a remote host, comprises further invoking a remote implementation of the open declaration on an editor buffer in a remote host.

10. The method of claim 8, further comprising synchronizing the editor buffer for the local IDE with the editor buffer in the remote host.

11. The method of claim 9, further comprising synchronizing the editor buffer for the local IDE with the editor buffer in the remote host.

12. A computer program product comprising at least one non-transitory computer usable medium having computer usable program code for distributed resource understanding tool management, the computer program product including:
  computer usable program code for invoking a local implementation of a resource understanding tool in a local integrated development environment (IDE);
  computer usable program code for further invoking a remote implementation of the resource understanding tool in a remote host;
  computer usable program code for combining results sets produced by each of the local and remote implementations of the resource understanding tool to produce a composite results set; and,
  computer usable program code for rendering the composite results set in the local IDE.

13. The computer program product of claim 12, further comprising:
  computer usable program code for caching frequently selected resources from the composite results set in a local cache; and,
  computer usable program code for retrieving resources from the local cache when producing the composite results set.

14. The computer program product of claim 12, wherein the computer usable program code for invoking a local implementation of a resource understanding tool in a local IDE comprises computer usable program code for invoking a local implementation of a content assist on an editor buffer for a local IDE, and wherein further the computer usable program code for invoking a remote implementation of the resource understanding tool in a remote host, comprises computer usable program code for further invoking a remote implementation of the content assist on an editor buffer in a remote host.

15. The computer program product of claim 12, wherein the computer usable program code for invoking a local implementation of a resource understanding tool in a local IDE comprises computer usable program code for invoking a local implementation of an open declaration on an editor buffer for a local IDE, and wherein further the computer usable program code for invoking a remote implementation of the resource understanding tool in a remote host, comprises computer usable program code for further invoking a remote implementation of the open declaration on an editor buffer in a remote host.

16. The computer program product of claim 14, further comprising computer usable program code for synchronizing the editor buffer for the local IDE with the editor buffer in the remote host.

17. The computer program product of claim 15, further comprising computer usable program code for synchronizing the editor buffer for the local IDE with the editor buffer in the remote host.

* * * * *